United States Patent [19]
DePellegrini et al.

[11] Patent Number: 5,024,038
[45] Date of Patent: Jun. 18, 1991

[54] APPARATUS AND METHOD FOR PROVING AN ANCHOR IN WALLS AND CEILINGS COMPOSED OF FRIABLE ASBESTOS CONTAINING MATERIAL

[75] Inventors: Donald D. DePellegrini, Pittsburgh; William E. Acker, Allison Park; Richard Hoff, Coraopolis, all of Pa.

[73] Assignee: University of Pittsburgh, Pittsburgh, Pa.

[21] Appl. No.: 509,475

[22] Filed: Apr. 16, 1990

[51] Int. Cl.⁵ .......................... E04B 2/00; E04B 9/00
[52] U.S. Cl. .................................. 52/700; 52/DIG. 2; 52/410; 52/483
[58] Field of Search ................... 52/DIG. 2, 410, 483, 52/700

[56] References Cited
U.S. PATENT DOCUMENTS 2,692,496 10/1954 Thomas ................................. 52/483
4,907,927 3/1990 Choiniere ............................. 52/512
4,911,191 3/1990 Bain ............................... 52/DIG. 2

Primary Examiner—John E. Murtagh
Assistant Examiner—Deborah McGann Ripley
Attorney, Agent, or Firm—Richard V. Westerhoff

[57] ABSTRACT

An anchor is formed in a wall or ceiling composed of friable asbestos containing material by placing a plate member having a seal member around its peripheral edge against the wall or ceiling and then driving a fastener through the plate member and into the wall or ceiling. The plate member is of a size to permanently contain between the plate member and the ceiling any friable asbestos containing material which is dislodged by the fastener. Preferably, the seal, which comprises a sealing strip with an adhesive coating, or a sealing adhesive, temporarily secures the plate member to the wall while the fastener is being driven through the plate member to assure that the plate remains in place; however, it is the fastener which permanently secures the plate member to the wall or ceiling.

16 Claims, 2 Drawing Sheets

APPARATUS AND METHOD FOR PROVING AN ANCHOR IN WALLS AND CEILINGS COMPOSED OF FRIABLE ASBESTOS CONTAINING MATERIAL

BACKGROUND

1. Field of the Invention

This invention relates to apparatus and a method for providing an anchor, such as, for example, for supporting a hung ceiling, pipes, conduits, ducts, pictures and the like, in ceilings or walls composed of friable asbestos containing materials, and more particularly relates to such an apparatus and method which permanently locally contains such friable asbestos containing material which is dislodged by penetrating the ceiling or wall to secure the anchor in place.

2. Background of the Invention

Asbestos was widely used in building materials for a number of years for its fire resistant and insulating properties. Asbestos fibers were commonly included in a slurry which was sprayed onto walls and ceilings. It was also used to strengthen plaster ceilings and walls by mixing a small portion of asbestos with compositions of lime, water and sand. It is now recognized that asbestos poses a health threat. As long as the walls and ceiling remain intact, there is no harm. However, the hardened slurry becomes friable when disturbed, and crumbles releasing asbestos fibers. Just driving a nail or drilling into such a wall or ceiling creates such a disturbance. Usually if there is to be any disturbance of the friable material, the area to be penetrated must be spot removed or the entire wall and/or ceiling is removed and replaced with a material not containing asbestos. Care must be taken to ensure that all of the asbestos removed is contained and properly disposed. This is time consuming and expensive.

There is a need, therefore, for apparatus and a method for providing anchors in walls or ceilings composed of asbestos containing materials which does not require spot removal or complete removal of the wall or ceiling.

There is a need for such a method and apparatus for containing friable asbestos containing material in place locally around an anchor which is simple, inexpensive and permanent.

SUMMARY OF THE INVENTION

These needs and others are satisfied by the invention which is directed to an apparatus and method for providing an anchor in a wall or ceiling composed of a friable asbestos containing material which does not require removal of the entire ceiling or wall, but rather locally and permanently contains friable asbestos containing material which is dislodged by driving a fastener for the anchor into the wall or ceiling. A plate member is placed against the wall or ceiling generally centered on the desired anchor point. A seal between the plate and the ceiling or wall is provided around the entire periphery of the plate. A fastening member is then driven through the plate and into the wall or ceiling. Friable asbestos containing material dislodged by penetration of the fastener is contained by the plate member and the seal. The plate member is sized to cover the entire portion of the wall or ceiling around the anchor point which is disturbed by the fastening member. The fastening member has a shaft which penetrates the plate member and the wall or ceiling, and a flange which clamps the plate and the seal member permanently against the wall or ceiling. The plate member is pressed with its seal against the ceiling or wall, and then the fastener is driven through the plate member, which is preferably made of sheet metal which is penetrated by the shaft of the fastener but forms an airtight seal around the fastener. There is no predrilled hole in the plate member, or if there is, it is smaller in diameter than the shaft of the fastener.

Preferably, the seal is secured to the plate and is provided with an adhesive, such that the plate may be pressed against the wall or ceiling over the anchor point and be temporarily held in place by the adhesive. In the exemplary embodiment of the invention, a removable protective strip is applied over the adhesive and removed just prior to use. The plate is permanently secured in place to contain the dislodged asbestos containing material by the fastener.

The invention is particularly suitable for providing anchors in ceilings containing asbestos containing materials for supporting a hung ceiling. For this purpose, the fastener may comprise a two-headed nail or other nail with means by which hanger wires for the hung ceiling may be secured to the fastener. For supporting pipes and ducts from ceilings or walls, a hanger strap may be placed against the plate and a conventional nail driven through the hanger strap and then the plate member, such that the head of the nail clamps the plate and seal against the wall or ceiling and retains the hanger strap. Such hanger straps can also be used alternatively for suspending a hung ceiling.

The invention offers an inexpensive means for supporting just about any sort of object or device, including for example, pictures from a wall or ceiling containing friable asbestos containing material without requiring spot or complete removal and replacement of the wall or ceiling.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
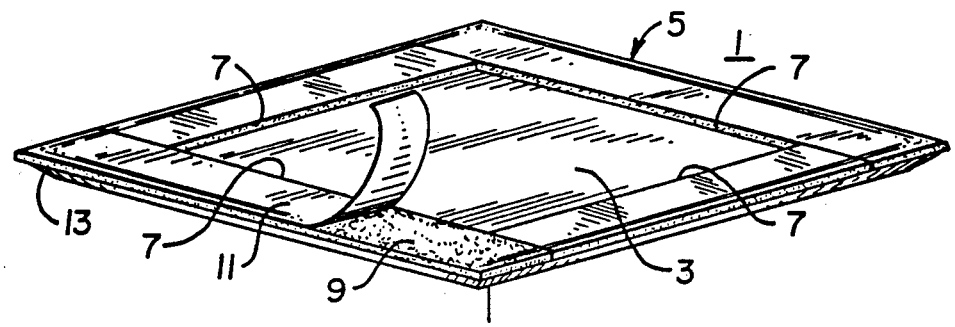
FIG. 1 is an exploded isometric view of apparatus in accordance the invention.
Figure 2:
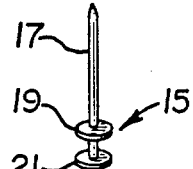
FIG. 2 is a vertical cross section through the apparatus of FIG. 1 shown in use as an anchor in a ceiling.
Figure 2:
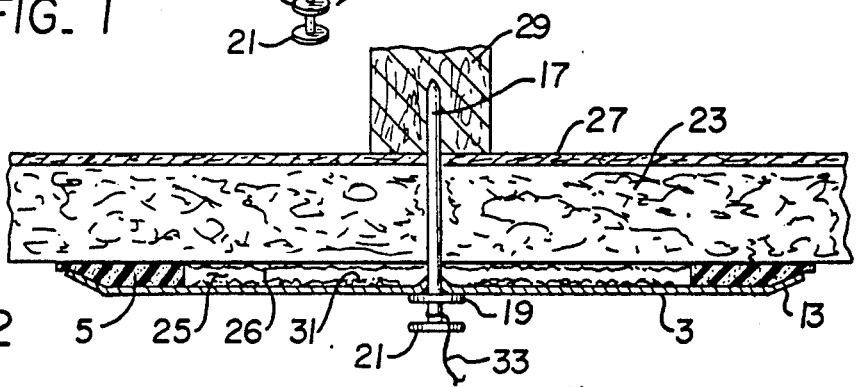

Referring to FIGS. 1 and 2, the apparatus 1 in accordance with the invention for providing an anchor in a wall or ceiling made of asbestos containing material, includes a plate member 3 having a peripheral seal 5 which extends entirely around the periphery of the plate member 3. The peripheral seal 5 preferably comprises strips of closed cell foam insulation 7 secured to the plate member 3 such as by an adhesive. The exposed surface of the strip 7 is also provided with an adhesive 9 which is covered by a protective strip 11. The plate member 3 is tucked along the peripheral edge to form a flange 13. The invention includes a fastener such as the two-headed nail 15 having a pointed shaft 17 and an anchoring device in the form of heads 19 and 21 spaced on the shaft 17.

To provide an anchor in, for instance, a ceiling 23 made of friable asbestos containing material, the protective strips 11 are removed from the seal member 7 and the plate 3 is pressed against the ceiling 23 generally centered over the anchor point. The adhesive 9 on the seal 7 temporarily retains the plate member in place against the sealing. The thickness of the seal and the flange 13 space the plate member 3 from the sealing to form a small cavity 25 between the sealing and the plate 3. The two-headed nail 15 is then driven through the plate 3 such as by a hammer, or preferably, by a power nail driver (not shown). The nail 15 penetrates the plaster containing asbestos of the ceiling 23 and preferably extends through lathing 27, if provided, and into a structural member supporting the ceiling such as a wooden joist 29 so that two-headed nail 15 is firmly anchored. By driving the nail 15 through the plate member 3, an airtight seal is formed between the plate member and the shaft 17 of the nail 15. A small pilot hole could be provided in the plate member, but any such pilot hole should be smaller than the diameter of the shaft 17 of the nail 15 so that an airtight seal is formed.

As the shaft 17 of the nail 15 penetrates the friable asbestos containing ceiling 23, friable material containing asbestos 31 is dislodged. This dislodged material 31 is contained within the cavity 25 by the plate 3 and the peripheral seal 5. The size of the plate 3 is selected so as to cover, with a generous margin, the disturbed area 26 of the ceiling 23 from which the friable asbestos containing material is dislodged by driving the nail 15 through the ceiling.

The nail 15 is driven into the ceiling 23 until the first nailhead 19 bears against the plate 3 to permanently secure the plate in place and thereby to permanently contain any friable asbestos containing material 31 dislodged from the ceiling. Thus, while the adhesive 9 on the seal 5 temporarily retains the plate member 3 in place during installation, it is the nail 15 which permanently secures the plate member 3 to the ceiling. While having the adhesive on the seal retain the plate member in place temporarily frees both the installer's hands for driving the fastener through the plate and into the ceiling, more importantly, it more reliably assures that the plate remains sealed against the ceiling while the nail is being driven into place thereby assuring that no asbestos fibers escape during installation.

When the two-headed nail 15 is used as the anchor, the second head 21 can be used to retain a wire 33 for supporting objects such as a hung ceiling from the anchor.

Figure 3:
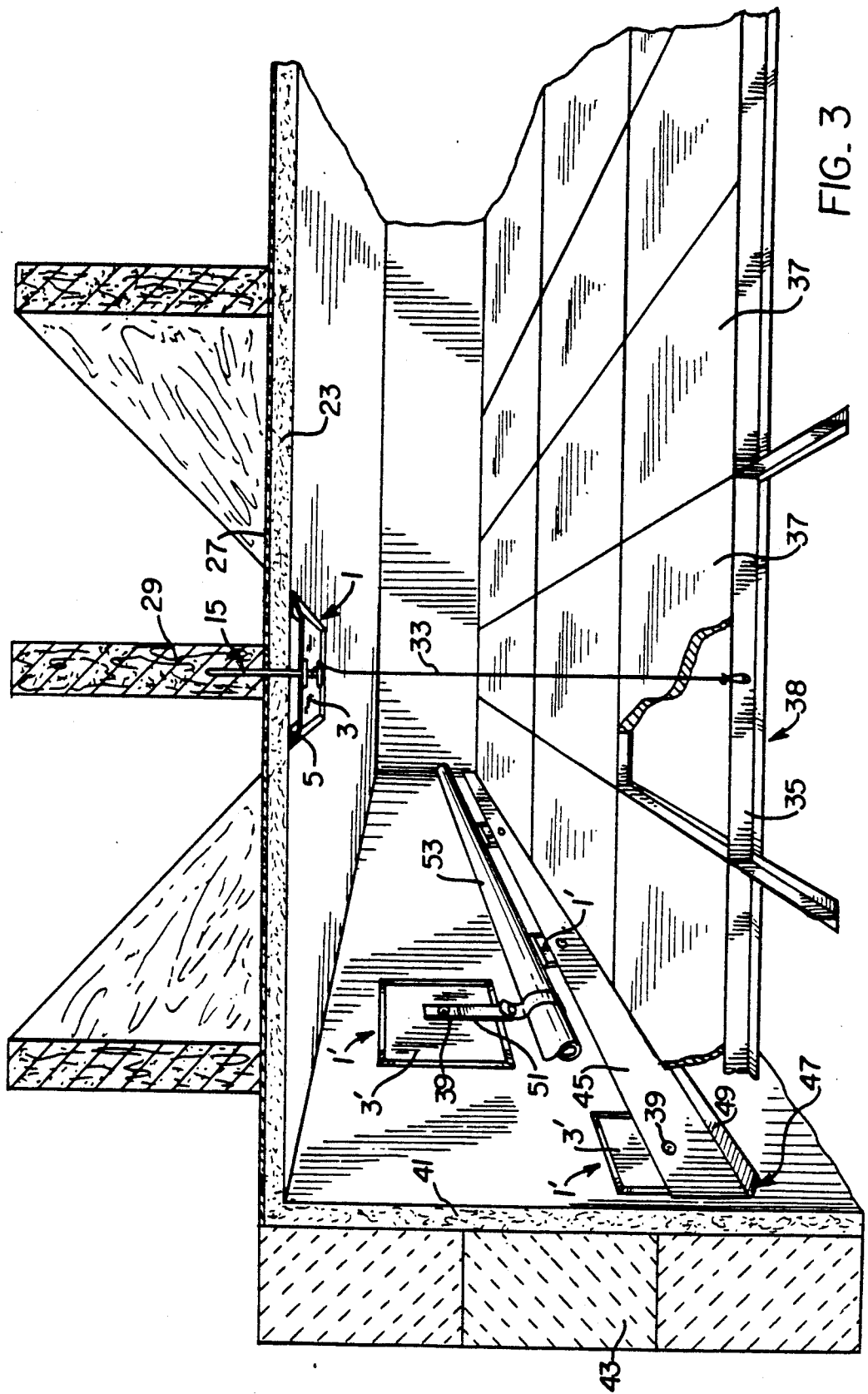
FIG. 3 is a perspective view illustrating use of the device of the invention as an anchor for supporting a hung ceiling and for supporting a pipe from a wall containing friable containing material.

FIG. 3 illustrates some uses of the invention. For instance, as already mentioned, the apparatus 1 incorporating the two-headed nail 15 driven through the friable plaster ceiling containing asbestos and into the joist 29 can be used to secure wires 33 for suspending a framework 35 which supports the decorative panels 37 of a hung ceiling 38. Additional anchoring members 1' can be used with a conventional nail 39 which is driven through the plate 3' and through the friable plaster containing asbestos wall surface 41 and into a masonry wall 43. The nail 39 is used to secure the web 45 of an edge support 47 having a flange 49 which supports the peripheral edges of the decorative panels 37 and support frame 35 around the walls 41.

As also seen in FIG. 3, the anchor 1' can also be used with a conventional nail 39 to anchor a support strap 51 for a pipe 53 extending above the hung ceiling 38. In another embodiment of the invention 1" shown in in configuration. The seal 55 around the peripheral edge of the plate member 3' is a sealing adhesive which can include a construction adhesive, such as, for example, a construction adhesive sold under the trademark M-D400 by Macklanburg-Duncan of Oklahoma City, Okla. A conventional nail 39 secures the flange 57 of sheet metal hanger 59 to the ceiling 23. The body 61 of the strap supports a duct 63. The plate member 3' can be of other shapes including irregular shapes for use near a corner or adjacent an obstruction.

It should be evident, at this point, that the apparatus 1 in accordance with the invention can be used with many types of hardware to safely and economically support a wide variety of objects from ceilings and walls made of friable materials containing asbestos.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. Apparatus for providing an anchor in walls and ceilings containing friable asbestos containing materials, said apparatus comprising:

a plate member which is placed against the wall or ceiling and generally centered over a selected anchor point, a peripheral seal between the plate and the wall or ceiling providing an airtight seal completely around said plate member, and a fastener having a shaft which is driven through said plate placed against said wall or ceiling and which penetrates and securely engages said wall or ceiling behind the plate member at said selected anchor point, said fastener dislodging friable material from a disturbed portion of said wall or ceiling surrounding said anchor point as the shaft penetrates the wall or ceiling, said fastener also having an anchor member secured to said shaft outside said plate and having a flange which bears against and clamps said plate member and peripheral seal permanently against said wall or ceiling, said plate member covering the entire disturbed portion of said wall or ceiling surrounding said anchor point from which friable asbestos containing material is dislodged as said shaft penetrates said wall to trap and permanently contain said dislodged friable asbestos containing material.

2. The apparatus of claim 1 wherein said peripheral seal member is secured to said plate member and includes an adhesive which temporarily secures the plate member in place against said ceiling or wall generally centered on said anchor point until said fastener is driven into said wall or ceiling and permanently secures said plate member to the wall or ceiling.

3. The apparatus of claim 2 wherein said seal member comprises a seal strip secured to said plate member and an adhesive coating on said seal strip which adheres to said ceiling or wall.

4. The apparatus of claim 3 including a protective strip over said adhesive coating which is removable to expose said adhesive coating for securing said plate member to said ceiling or wall.

5. The apparatus of claim 2 wherein said seal member comprises a sealing adhesive.

6. The apparatus of claim 1 wherein said plate member is composed of sheet metal through which said fastener is driven while said plate member is in place generally centered over said anchor point.

7. The apparatus of claim 6 wherein said plate member is provided with a peripheral flange extending generally toward said wall or ceiling when said plate member is placed against the wall or ceiling, said peripheral flange bearing against and pressing said seal member against the wall or ceiling when said fastener is driven into place to permanently secure the plate member to the wall or ceiling.

8. The apparatus of claim 7 wherein said seal member includes an adhesive which temporarily secures the plate member in place against said wall or ceiling until said fastener is driven into said wall or ceiling.

9. The apparatus of claim 1 wherein said fastener is a two-headed nail having a first head comprising said flange of said anchor member and a second head spaced from the first head.

10. The apparatus of claim 1 wherein said fastener is a nail having a head which forms the flange of said anchor member, wherein said anchor member includes a hanger strap through which said nail is driven and which is secured against said plate member by said head.

11. A plate assembly for use with a fastener to provide an anchor in walls and ceilings containing friable asbestos containing materials which dislodged over a disturbed portion of the wall or ceiling when the fastener is driven there into said assembly comprising:

a plate member which is placed against the wall or ceiling and through which said fastener is driven into said wall or ceiling, and a peripheral seal member extending completely around said plate member to form an airtight seal between the plate and the wall or ceiling, said peripheral seal member including an adhesive which temporarily retains said plate member against said wall or until said fastener is driven through said plate member to permanently secure the plate member against the wall or ceiling, said plate member being of a size sufficient to completely cover said disturbed portion of the ceiling or wall to permanently contain friable asbestos containing material dislodged by said fastener.

12. The assembly of claim 11 wherein said peripheral seal member comprises strips of foam sealing material coated with an adhesive.

13. The assembly of claim 12 wherein said peripheral seal member includes removable protective strips over said adhesive.

14. The assembly of claim 12 wherein said plate member is provided with a peripheral flange extending generally toward said wall or ceiling when the plate member is placed against the wall or ceiling, said peripheral flange bearing against and pressing said seal member against the wall or ceiling when said fastener is driven into place to permanently secure the plate member to the wall or ceiling.

15. The assembly of claim 11 wherein said plate member is provided with a peripheral flange extending generally toward said wall or ceiling when said plate member is placed against the wall or ceiling, said peripheral flange bearing against and pressing said seal member against the wall or ceiling when said fastener is driven into place to permanently secure the plate member to the wall or ceiling.

16. The assembly of claim 11 wherein said seal member comprises a sealing adhesive.

* * * * *

UNITED STATES PATENT AND TRADEMARK OFFICE
CERTIFICATE OF CORRECTION

PATENT NO. : 5,024,038

DATED : June 18, 1991

INVENTOR(S) : Donald D. Depellegrini, William E. Acker and Richard Hoff

It is certified that error appears in the above-indentified patent and that said Letters Patent is hereby corrected as shown below:

On the title page, item [54] and in col. 1, line 1, "PROVING" should be --PROVIDING--.

Column 2, line 46, --with-- should be inserted before "the".

Figure 4:
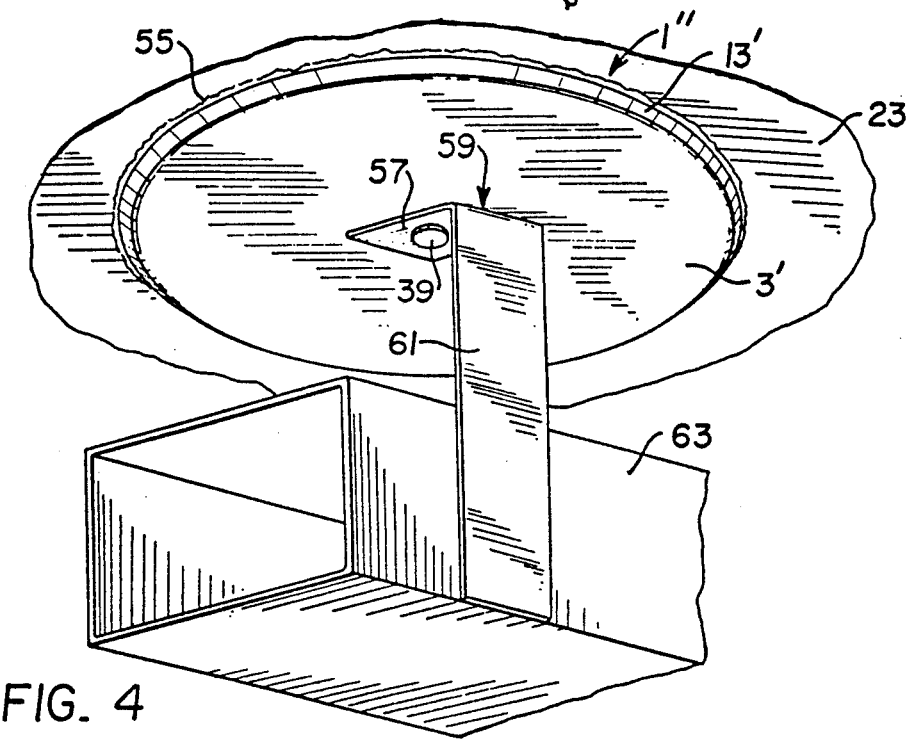
FIG. 4 is an isometric view illustrating another embodiment of the invention.

Column 4, line 4, after the word "in", first occurrence, insert --Figure 4, the plate member 3' with a flange 13' is circular--.

Signed and Sealed this

Seventeenth Day of August, 1993

Attest:

BRUCE LEHMAN

*Attesting Officer*  *Commissioner of Patents and Trademarks*